UNITED STATES PATENT OFFICE.

WM. L. FABER, OF NEW YORK, N. Y.

IMPROVEMENT IN SMELTING COPPER ORES.

Specification forming part of Letters Patent No. 47,407, dated April 25, 1865.

*To all whom it may concern:*

Be it known that I, WILLIAM L. FABER, of No. 69 Wall street, in the city, county, and State of New York, have invented a new and useful Improvement in Smelting Copper and Copper Ores; and I do hereby declare that the following is a full, clear, and exact description thereof, which will enable others skilled in the art to fully understand and make use of the same.

The object of this invention is to remove from copper and copper ores, during the process of smelting, such impurities as antimony and arsenic, and this purpose is effected by a process which is strictly confined to copper and copper ores, and which has to be modified materially for treating other ores.

The invention consists in the employment or use of some substance developing chlorine during the process of roasting copper or copper ores in such a manner that by the action of said chlorine antimony and arsenic are effectually separated from the copper or copper ore, and a chemically pure article (or nearly so) is the result.

I first roast the ore, and smelt to produce the first matt, which is then again pulverized, roasted, and smelted, to produce a second matt, and this process is repeated several times, according to the nature of the ore, until the matt has gone through a sufficient number of processes to be as rich in copper as matt can be to be pulverized. After pulverizing into an impalpable powder, this matt is roasted at a low temperature until the sulphur contained in it has been completely converted into sulphuric acid, (which combines with the oxides of the metals,) and until the acid has nearly all been driven off by the heat of roasting. If the matt clots during the process of roasting it must be repulverized. Enough sulphuric acid must be left, however, that the remaining quantity is at least three or four times the weight of the antimony and arsenic in the matt—which point is easily determined by a practical smelter—and then I add common salt about four times the weight of antimony or arsenic, or both combined, and roast at a low red heat, gradually increasing the temperature to a bright orange, and maintaining it at this until the sulphuric acid is expelled, stirring constantly. By this time the antimony and arsenic will also be gone, being wholly converted into volatile chlorides. By adding the salt before much sulphuric acid is expelled part of the chlorine of the salt may be converted into chloride of sulphur, and part of the copper into chloride of copper; but even if the salt is added at the beginning of the roasting operation the antimony and arsenic will be expelled, although perhaps at the loss of a little copper. After the roasting process has been completed, and the antimony and arsenic expelled, there remains in the furnace only oxides of copper and other metals, from which the copper is reduced and refined by the usual known methods. The fumes of chloride of arsenic and antimony passing off do not injure the furnace or the health of the workman, and if the operation is conducted with care, not a particle of copper is lost by roasting with salt. The salt may be added and mixed with the matt by grinding them together, or the pulverized matt may be moistened with a concentrated solution of salt in the proper quantity. In place of salt any other substance which will yield chlorine under the above circumstances may be used—such as chloride of copper or muriatic acid—and the substance most available in each case is a mere question of economy, and may be different for different ores and different works. The same method may be employed for metallic copper containing arsenic and antimony by granulating the copper and oxidizing by roasting, when the salt may be added as before, adding, however, in this case a quantity of either blue vitriol or copperas equal to the quantity of salt added. The metallic copper may also be prepared for the purpose by fusing it with sulphur or sulphureted ores, and thus making an artificial matt, the treatment of which is the same as that of the ordinary matt.

By this process copper is freed from antimony and arsenic, and while copper adulterated with these substances, or either of them, is unsalable and unfit for anything except the roughest castings, copper when treated according to my process is made pure enough to be used for all technical or other purposes.

I do not claim, broadly, the use of salt in smelting ores, such having been used long ago in treating auriferous and argentiferous ores; but,

Having thus described my invention, I claim as new and desire to secure by Letters Patent—

The within-described process for expelling antimony and arsenic from copper and copper ores by roasting with some substance developing chlorine during the process of roasting, substantially as herein set forth.

WILLIAM LEONARD FABER.

Witnesses:
M. M. LIVINGSTON,
C. L. E. TOPLIFF.